(12) United States Patent
Suteerawanit (10) Patent No.: US 12,284,997 B2
(45) Date of Patent: Apr. 29, 2025

(54) GERMAN COCKROACH GLUE TRAP

(71) Applicant: Nick Suteerawanit, Laguna Woods, CA (US)

(72) Inventor: Nick Suteerawanit, Laguna Woods, CA (US)

( * ) Notice: Subject to any disclaimer, the term of this patent is extended or adjusted under 35 U.S.C. 154(b) by 0 days.

(21) Appl. No.: 18/583,133

(22) Filed: Feb. 21, 2024

(65) Prior Publication Data

US 2024/0397924 A1    Dec. 5, 2024

Related U.S. Application Data (63) Continuation-in-part of application No. 18/204,825, filed on Jun. 1, 2023, now Pat. No. 11,937,593.

(51) Int. Cl.
*A01M 1/14*         (2006.01)
*A01M 1/10*         (2006.01)

(52) U.S. Cl.
CPC .............. *A01M 1/14* (2013.01); *A01M 1/103* (2013.01)

(58) Field of Classification Search
CPC .......... A01M 1/103; A01M 1/10; A01M 1/14; A01M 1/145; A01M 1/00; A01M 1/02
USPC ............................................ 43/121, 114, 107
See application file for complete search history.

(56) References Cited

U.S. PATENT DOCUMENTS

| | | | | |
|---|---|---|---|---|
| 529,109 A | * | 11/1894 | Burgess | A01M 1/103 43/121 |
| 544,183 A | * | 8/1895 | Marchese | A01M 1/103 43/121 |
| 554,616 A | * | 2/1896 | Cook | A01M 1/103 43/121 |
| 600,530 A | * | 3/1898 | Harig | A01M 1/14 43/115 |
| 790,620 A | * | 5/1905 | Crofford | A01M 1/02 43/115 |
| 812,761 A | * | 2/1906 | Meier | A01M 1/103 43/65 |
| 868,514 A | * | 10/1907 | Westerbeck | B65D 43/022 220/802 |

(Continued)

FOREIGN PATENT DOCUMENTS

| | | | | |
|---|---|---|---|---|
| CA | 2324586 A1 | * | 4/2002 | A01M 1/14 |
| CN | 206462242 U | * | 9/2017 | |

(Continued)

*Primary Examiner* — Darren W Ark
(74) *Attorney, Agent, or Firm* — AGK Patent & Trademark Law; Philip Y Kim (57) ABSTRACT

A German cockroach glue trap comprising a dark colored base and lid. The base having an overall height between 25 mm and 40 mm. Openings through the base have a diameter between 3.5 mm and 4.5 mm, large enough for German cockroaches to enter but not too large to let in too much light. The centers of the lowest openings having heights preferably between 6 mm and 10 mm above a floor preventing touching the glue before being caught and allowing escape. A ceiling at least 7 mm above the centers of the highest openings preventing climbing to the ceiling. The openings are in thin walls not providing a shelf for the German cockroaches to linger and detect a scent (oleic acid) of dead cockroaches which repels additional German cockroaches from entering the trap. A layer of glue resides on the floor and a second layer of glue may reside on the ceiling.

4 Claims, 9 Drawing Sheets

(56) References Cited

U.S. PATENT DOCUMENTS

| | | | | |
|---|---|---|---|---|
| 1,134,318 A * | 4/1915 | Deardoff | A01M 1/103 | 43/121 |
| 1,161,388 A * | 11/1915 | Johnson | A01M 1/103 | 43/115 |
| 1,261,842 A * | 4/1918 | Muller | A01M 1/103 | 43/123 |
| 1,485,867 A * | 3/1924 | Mooney | A01M 1/02 | 43/121 |
| 2,000,193 A * | 5/1935 | Schroder | A01M 1/106 | 43/121 |
| 2,695,115 A * | 11/1954 | Roop | B65D 21/0219 | 206/508 |
| 2,752,970 A * | 7/1956 | Tupper | B65D 1/42 | D9/425 |
| 3,023,539 A * | 3/1962 | Emerson, Jr. | A01M 1/145 | 43/113 |
| 3,355,056 A * | 11/1967 | Fisch | B65D 43/0218 | 220/802 |
| 3,802,116 A * | 4/1974 | Meguro | A01M 1/02 | 43/121 |
| 3,816,956 A * | 6/1974 | Sekula | A01M 1/14 | 43/114 |
| 3,851,417 A * | 12/1974 | Wunsche | A01M 1/02 | 43/121 |
| 3,908,302 A * | 9/1975 | Carr | A01M 1/02 | 43/121 |
| 3,913,259 A * | 10/1975 | Nishimura | A01M 1/02 | 43/121 |
| 3,940,874 A * | 3/1976 | Katsuda | A01M 1/14 | 43/114 |
| 4,030,233 A * | 6/1977 | Wunsche | A01M 1/103 | 43/121 |
| 4,031,654 A * | 6/1977 | Gray | A01M 1/14 | 43/114 |
| 4,044,495 A * | 8/1977 | Nishimura | A01M 1/14 | 43/121 |
| 4,208,828 A * | 6/1980 | Hall | A01M 1/02 | 43/121 |
| 4,214,400 A * | 7/1980 | Patmore | A01M 1/14 | 43/121 |
| 4,217,722 A * | 8/1980 | McMullen | A01M 1/14 | 43/121 |
| 4,286,713 A * | 9/1981 | Marchais | B65D 21/0217 | 206/508 |
| 4,395,842 A * | 8/1983 | Margulies | A01M 1/14 | 43/121 |
| 4,709,503 A * | 12/1987 | McQueen | A01M 1/14 | 43/121 |
| 4,709,504 A * | 12/1987 | Andric | A01M 1/14 | 43/121 |
| 4,815,231 A * | 3/1989 | McQueen | A01M 1/14 | 43/121 |
| 4,819,371 A * | 4/1989 | Cohen | A01M 1/2011 | 43/131 |
| 4,876,823 A * | 10/1989 | Brunetti | A01M 1/14 | 43/124 |
| 5,172,514 A * | 12/1992 | Weber | A01M 1/02 | 43/132.1 |
| 5,238,681 A * | 8/1993 | Chang | A01N 25/34 | 43/132.1 |
| 5,303,501 A * | 4/1994 | Seemann | A01M 1/026 | 434/428 |
| 5,310,552 A * | 5/1994 | Gunner | A01N 63/30 | 43/132.1 |
| 5,398,442 A * | 3/1995 | Musket | A01M 1/14 | 229/120.09 |
| 5,427,266 A * | 6/1995 | Yun | B65D 79/02 | 220/780 |
| 5,427,784 A * | 6/1995 | Gunner | A01N 63/30 | 43/132.1 |
| 5,438,792 A * | 8/1995 | Monett | A01M 1/14 | 43/121 |
| 5,454,186 A * | 10/1995 | Gang | A01M 1/02 | 43/114 |
| 5,572,825 A * | 11/1996 | Gehret | A01M 1/02 | 229/120.11 |
| 5,771,628 A * | 6/1998 | Nobbs | A01M 1/2011 | 43/132.1 |
| 5,868,268 A * | 2/1999 | Walker | B65D 55/16 | 220/802 |
| 5,930,944 A * | 8/1999 | Knuppel | A01M 31/002 | 43/121 |
| 5,979,108 A * | 11/1999 | Adams | A01M 1/2011 | 43/131 |
| 6,389,738 B1 * | 5/2002 | Denny | A01M 1/2011 | 43/58 |
| 6,618,983 B1 * | 9/2003 | Spragins | A01M 1/2016 | 43/132.1 |
| 7,017,775 B2 * | 3/2006 | Zettle | B65D 43/021 | 206/508 |
| 7,299,587 B1 * | 11/2007 | Metcalfe | A01M 1/02 | 43/107 |
| 7,823,746 B1 * | 11/2010 | McCumber | B65D 25/325 | 426/106 |
| 7,856,752 B1 * | 12/2010 | Eilersen | A01M 1/14 | 43/115 |
| 8,381,946 B2 * | 2/2013 | Everson | B65D 43/162 | 220/837 |
| 8,413,370 B2 * | 4/2013 | Messian | A01M 1/14 | 43/123 |
| 8,418,871 B1 * | 4/2013 | LaMasney | B65D 1/34 | 220/802 |
| 8,985,386 B2 * | 3/2015 | Everson | B65D 43/162 | 220/839 |
| 9,226,488 B2 * | 1/2016 | Schumacher | A01M 1/026 | |
| 9,526,237 B2 * | 12/2016 | Zhang | A01M 1/103 | |
| 10,098,337 B2 * | 10/2018 | Yans | A01M 1/14 | |
| 10,952,425 B2 * | 3/2021 | Choe | A01M 1/026 | |
| 11,344,021 B1 * | 5/2022 | Suteerawanit | A01M 1/02 | |
| 11,937,593 B1 * | 3/2024 | Suteerawanit | A01M 1/14 | |
| 2001/0001353 A1 * | 5/2001 | Jones | A01M 23/005 | 424/414 |
| 2002/0104255 A1 * | 8/2002 | Hobson | A01M 1/14 | 43/114 |
| 2002/0104846 A1 * | 8/2002 | Rosenfeld | B65D 1/10 | 206/508 |
| 2003/0155365 A1 * | 8/2003 | Llorente Lecue | B65D 43/021 | 220/802 |
| 2004/0251257 A1 * | 12/2004 | Schultz | B65D 81/3453 | 220/366.1 |
| 2005/0102889 A1 * | 5/2005 | Hoyes | A01M 1/026 | 43/114 |
| 2005/0160659 A1 * | 7/2005 | Forehand | A01M 1/106 | 43/107 |
| 2006/0053682 A1 * | 3/2006 | Goldstein | A01M 23/08 | 43/67 |
| 2006/0283075 A1 * | 12/2006 | Feldhege | A01M 1/02 | 43/121 |
| 2007/0107297 A1 * | 5/2007 | Wijenberg | A01M 1/026 | 43/107 |
| 2007/0193109 A1 * | 8/2007 | Chyun | A01M 1/026 | 43/107 |
| 2010/0011655 A1 * | 1/2010 | Frisch | A01M 1/14 | 43/114 |
| 2010/0269402 A1 * | 10/2010 | Blazer | A01M 1/106 | 43/107 |
| 2014/0220859 A1 * | 8/2014 | McCutchan | A01M 1/02 | 119/416 |
| 2015/0021321 A1 * | 1/2015 | Gosen | B65D 21/0204 | 220/802 |
| 2016/0106087 A1 * | 4/2016 | Ng | A01M 1/14 | 43/114 |
| 2017/0006849 A1 * | 1/2017 | Frutos | A01M 1/14 | |
| 2017/0013821 A1 * | 1/2017 | Brown | A01M 1/14 | |
| 2017/0215402 A1 * | 8/2017 | Bertrand | A01M 1/12 | |
| 2017/0245488 A1 * | 8/2017 | Zhang | A23K 20/10 | |
| 2018/0077917 A1 * | 3/2018 | Mailleux | A01M 1/14 | |
| 2018/0184635 A1 * | 7/2018 | Studer | A01M 1/04 | |

(56) References Cited

U.S. PATENT DOCUMENTS

| | | | |
|---|---|---|---|
| 2020/0214279 A1* | 7/2020 | Tsai | G06V 10/143 |
| 2020/0245605 A1* | 8/2020 | Vickery | A01M 1/14 |
| 2021/0169060 A1* | 6/2021 | Spangler | A01M 1/02 |
| 2021/0259231 A1* | 8/2021 | Akiba | A01M 1/103 |
| 2022/0192173 A1* | 6/2022 | Warthen | A01M 1/14 |
| 2022/0386585 A1* | 12/2022 | Mailleux | A01N 25/18 |

FOREIGN PATENT DOCUMENTS

| | | | | |
|---|---|---|---|---|
| CN | 207167511 U | * | 4/2018 | |
| CN | 208783601 U | * | 4/2019 | |
| CN | 210580623 U | * | 5/2020 | |
| CN | 112243978 A | * | 1/2021 | |
| CN | 112352756 A | * | 2/2021 | |
| CN | 213992182 U | * | 8/2021 | |
| CN | 214629335 U | * | 11/2021 | |
| CN | 215454879 U | * | 1/2022 | |
| CN | 216018635 U | * | 3/2022 | |
| CN | 216601365 U | * | 5/2022 | |
| DE | 2323514 A1 | * | 12/1973 | |
| DE | 29507823 U1 | * | 4/1996 | |
| DE | 102005038589 A1 | * | 3/2007 | A01M 1/14 |
| EP | 0281744 A2 | * | 9/1988 | |
| FR | 2620304 A3 | * | 3/1989 | |
| GB | 1507696 A | * | 4/1978 | A01M 1/02 |
| GB | 2210543 A | * | 6/1989 | A01M 1/14 |
| JP | S61165175 U | * | 10/1986 | |
| JP | H09154465 A | * | 6/1997 | |
| JP | 2001078643 A | * | 3/2001 | |
| JP | 2002000155 A | * | 1/2002 | |
| JP | 2007159521 A | * | 6/2007 | |
| JP | 3155614 U | * | 11/2009 | |
| JP | 5574355 B1 | * | 8/2014 | |
| JP | 2015139412 A | * | 8/2015 | |
| JP | 6309135 B1 | * | 4/2018 | |
| JP | 6383026 B2 | * | 8/2018 | |
| JP | 2018121566 A | * | 8/2018 | |
| JP | 6430725 B2 | * | 11/2018 | |
| JP | 2018174812 A | * | 11/2018 | |
| JP | 2018198589 A | * | 12/2018 | |
| JP | 2019013209 A | * | 1/2019 | |
| JP | 2019083801 A | * | 6/2019 | |
| JP | 2019126288 A | * | 8/2019 | |
| JP | 2019170203 A | * | 10/2019 | |
| JP | 2019170204 A | * | 10/2019 | |
| JP | 2020110072 A | * | 7/2020 | |
| JP | 2020115819 A | * | 8/2020 | |
| JP | 2020171268 A | * | 10/2020 | |
| JP | 2020198785 A | * | 12/2020 | |
| JP | 2021114922 A | * | 8/2021 | |
| KR | 20030021227 A | * | 3/2003 | |
| KR | 200421240 Y1 | * | 7/2006 | |
| KR | 20080098275 A | * | 11/2008 | |
| KR | 20080100721 A | * | 11/2008 | |
| KR | 20080100722 A | * | 11/2008 | |
| KR | 100871428 B1 | * | 12/2008 | |
| KR | 20090012801 A | * | 2/2009 | |
| KR | 20090032253 | | 4/2009 | |
| KR | 20090032253 A | * | 4/2009 | |
| KR | 20090056761 A | * | 6/2009 | |
| KR | 20090072571 A | * | 7/2009 | |
| KR | 20090008154 | | 8/2009 | |
| KR | 20090008154 U | * | 8/2009 | |
| KR | 20100007491 A | * | 1/2010 | |
| KR | 20100002340 U | * | 3/2010 | |
| KR | 20130051151 A | * | 5/2013 | |
| KR | 20240027420 A | * | 3/2024 | |
| RU | 2131188 C1 | * | 6/1999 | |
| WO | WO-9622684 A1 | * | 8/1996 | A01M 1/02 |
| WO | WO-9811775 A1 | * | 3/1998 | A01M 1/2005 |
| WO | WO-02056679 A2 | * | 7/2002 | A01M 1/14 |
| WO | WO-2004098279 A2 | * | 11/2004 | A01M 1/02 |
| WO | WO-2005082140 A1 | * | 9/2005 | A01M 1/026 |
| WO | WO-2007059075 A1 | * | 5/2007 | A01M 1/02 |
| WO | WO-2015116801 A2 | * | 8/2015 | A01M 1/02 |
| WO | WO-2015129976 A1 | * | 9/2015 | A01M 1/14 |
| WO | WO-2019092043 A1 | * | 5/2019 | A01M 1/02 |
| WO | WO-2019181881 A1 | * | 9/2019 | |
| WO | WO-2019198931 A1 | * | 10/2019 | A01M 1/02 |
| WO | WO-2020009032 A1 | * | 1/2020 | A01M 1/02 |
| WO | WO-2021152681 A1 | * | 8/2021 | |
| WO | WO-2023157760 A1 | * | 8/2023 | |

* cited by examiner

GERMAN COCKROACH GLUE TRAP

The present application is a Continuation In Part of U.S. patent application Ser. No. 18/204,825 filed Jun. 1, 2023, which application is incorporated in its entirety herein by reference.

BACKGROUND OF THE INVENTION

The present invention relates to insect control and in particular to German cockroach control.

German cockroaches are attracted by heat and humidity. German cockroaches prefer a temperature of 85° to 95° F. with a humidity of 90 to 95% (although they do quite well at normal room temperatures and humidity also). German cockroaches will be concentrated within a given room where the temperature or humidity is highest, such as above refrigerators and other heat-generating equipment, under the sink, and around water pipes.

German cockroaches are a significant problem in the United States, Canada, and other countries where they tend to infest food preparation establishments, kitchens, and bathrooms. They are small, about one half inch long, are tan to nearly black in color, and have wings but do not fly. The German cockroaches may be difficult to identify because they hide in dark areas, but may be identified by the presence of their fecal matter which looks like pepper/coffee grounds. A significant problem is that German cockroaches reproduce at a very high rate, and adult females can produce from four to eight egg capsules in their lifetime. Each capsule contains 30-48 eggs.

Because German cockroaches have been found to carry *Salmonella*, which may cause food poisoning, they are a significant problem. German cockroach skins and droppings can also trigger an allergic reaction in people with asthma or other sensitivities. The discovery of German cockroaches in a restaurant may cause health code issues, and a loss of customers.

Glue traps have been developed and have provided some success. For example, U.S. Pat. No. 4,709,503 filed by McQueen, discloses a trap having small elliptical openings into the trap and a sticky surface inside the trap to capture insects. The openings are between $\frac{1}{16}$ and $\frac{1}{8}$ inches in diameter (too small for German cockroaches) and about one opening diameter above the floor. Unfortunately insects like a German cockroach can step into the trap, feel the sticky surface, and escape before being trapped. The openings are also only slightly below ceilings of each layer, allowing German cockroaches to cling to the ceilings, avoiding the glue. Other glue traps have larger than necessary openings allowing in significant light, thereby not providing a dark interior region preferred by the German cockroaches.

U.S. Pat. No. 4,044,495 to Nishimura discloses a cockroach trap having stepping plates 3 starting at floor level and having an elevated edge between 3 mm to 30 mm height inside the trap, so that once a German cockroach steps off the end of the ramp "it is difficult for cockroaches to retreat in such a downwardly inclined position, it is obliged to move forward and is completely captured by the sticky layer," as described in column 4 lines 17-20. Unfortunately, German cockroaches have a sticky pad called an arolium on their feet, allowing cockroaches to hold onto the top surfaces of stepping plates 3 with their rear legs, allowing the cockroaches to pull their forelegs and antennae from glue on the trap floor and escape. Further, dead cockroaches emit a scent (oleic acid) that repels other cockroaches. The lengths of the stepping plates 3 further provide additional opportunities for the cockroaches to enter the trap and sense the oleic acid from dead cockroaches in the trap, and escape before contacting the glue.

Many known cockroach glue traps include openings at two or three different levels. The lower levels which are too low may allow the cockroaches to reach in and feel the glue and escape. The higher levels may allow the cockroaches to easily reach to the ceiling and avoid the glue on the floor.

Because known insect traps fail to adequately capture German cockroach, there is a need for a better German cockroach trap.

BRIEF SUMMARY OF THE INVENTION

The present invention addresses the above and other needs by providing a German cockroach glue trap with openings large enough for German cockroaches to enter, but not too large thus limiting light entering the trap. The openings are elevated above the floor to prevent the German cockroaches from feeling the glue before entering the trap. A trap ceiling is high enough above the openings to prevent the German cockroaches from clinging to the ceiling upon entering the trap. The trap may also include a glue layer on the ceiling to capture German cockroaches which climb to the ceiling. The openings are in thin walls not providing a shelf for the German cockroaches to linger and detect a scent (oleic acid) of dead cockroaches which repels additional German cockroaches from entering the trap.

In accordance with one aspect of the invention, there is provided a German cockroach glue trap having openings large enough for German cockroaches to enter but not too large to let in too much light. German cockroaches prefer dark areas, and limiting the amount of light entering the trap attracts the German cockroaches. For example an opening diameter between 3.5 mm and 4.5 mm, and preferably 4 mm, or an opening between 3.5 mm and 4.5 mm high and wide, and preferably 4 mm high and wide, allows the German cockroaches to enter but limits light entering the trap.

In accordance with another aspect of the invention, there is provided a German cockroach glue trap having openings through thin walls high enough above a trap floor to cause the German cockroaches to immediately fall onto the glue upon entering the trap, making it more likely to stick to the glue. The openings through the thin walls are preferably between 0.25 mm and 0.89 mm deep. The thin openings also prevent the German cockroaches from lingering in one of the openings before entering the trap and being repelled by the scent of oleic acid of dead German cockroaches.

In accordance with yet another aspect of the invention, there is provided a German cockroach glue trap having lowest openings at sufficient height above a glue covered floor to cause German cockroaches to fall from the openings and legs and antenna become stuck to the glue and to prevent the German cockroaches from touching the floor before being trapped by the glue. The height of the lowest openings above the floor is important because additional openings closer to the floor are likely to result in the German cockroaches touching the glue before being caught by glue, and allowing the German cockroaches to escape. The centers of the lowest openings have heights preferably at least 6 mm above the floor, and more preferably between 6 mm and 10 mm above the floor, and most preferably 8 mm, above the floor.

In accordance with still another aspect of the invention, there is provided a single row German cockroach glue trap having a ceiling high enough above the openings to prevent or limit the German cockroaches immediately clinging to the ceiling upon entering the trap. The ceiling of a single row trap is at least 14 mm above the center of the openings, and is preferably between 14 mm and 32 mm above the center of the openings, and more preferably between 14 mm and 20 mm above the center of the openings, and most preferably about 17 mm above the center of the openings. The height of the ceiling above the openings is important because if the openings are too close to the ceiling, German cockroaches may enter the openings and climb onto the ceiling.

In accordance with another aspect of the invention, there is provided a multi-row German cockroach glue trap having a ceiling high enough above the highest openings to prevent or limit the German cockroaches immediately clinging to the ceiling upon entering the trap. The ceiling of a multi-row trap, is at least 7 mm above the center of the highest openings, and is preferably between 7 mm and 30 mm above the center of the highest openings, and more preferably between 8 mm and 12 mm above the center of the highest openings, and most preferably about 10 mm above the center of the highest openings. The height of the ceiling above the highest opening is important because if any of the openings are too close to the ceiling, German cockroaches may enter the openings and climb onto the ceiling.

In accordance with another aspect of the invention, there is provided a German cockroach glue trap having ceiling glue on a trap ceiling. If the German cockroaches enter the trap and climb to the trap ceiling, the ceiling glue captures the German cockroach.

In accordance with yet another aspect of the invention, there is provided a German cockroach glue trap having the benefits of 1) no chemical involvement, which is safe for pets and children; 2) simple application: peel the paper out of the top of the glue, add bait, put a cap on the top, and place it in the infested location; and 3) inexpensive.

BRIEF DESCRIPTION OF THE SEVERAL VIEWS OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 1A:
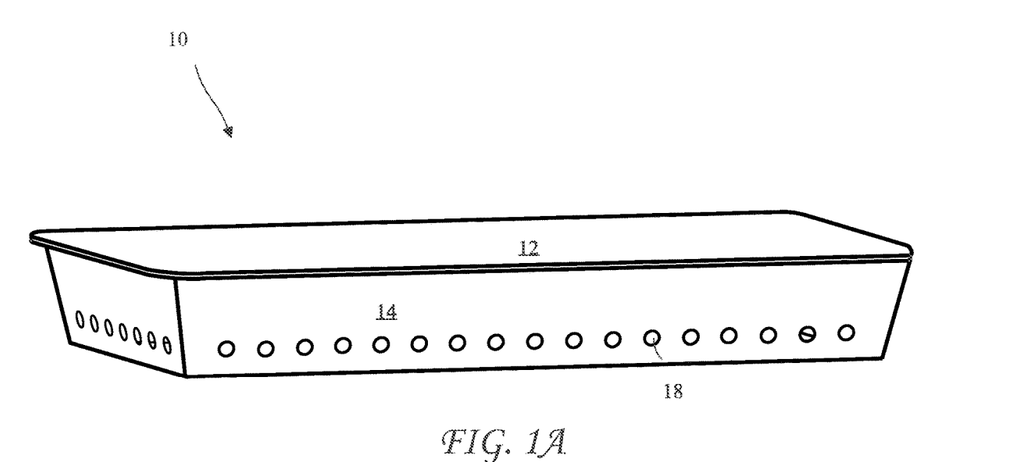
FIG. 1A is a perspective view of a single row glue trap according to the present invention.
Figure 1B:
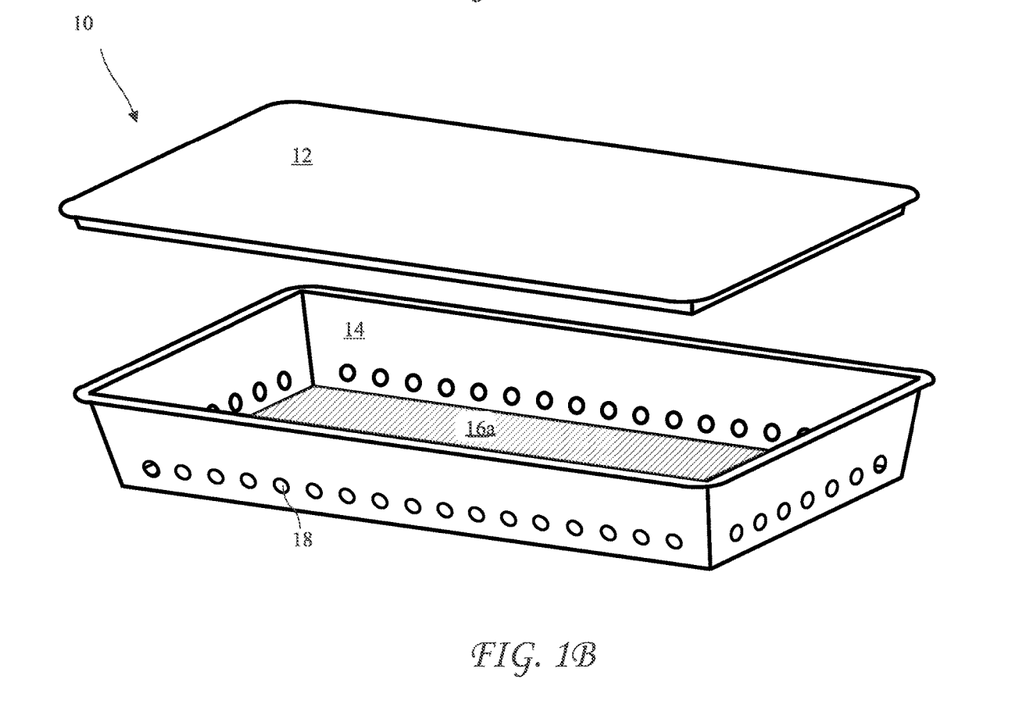
FIG. 1B is an exploded view of the single row glue trap according to the present invention.

A perspective view of a single row glue trap 10 is shown in FIG. 1A and an exploded view of the glue trap 10 is shown in FIG. 1B. The glue trap 10 comprising a base 14 and a lid 12. The base 14 includes openings 18 allowing German cockroaches to enter the trap 10. The base 14 is tapered for improved storage and delivery. Only a single row of openings 18 are shown in FIGS. 1A and 1B, but a German cockroach glue trap 10 according to the present invention may have two or more rows of openings 18 in the base 14, and may have staggered openings, without departing from the present invention, as long as the openings have diameters as described in the following description and reside at heights described in the following description.

Figure 2A:
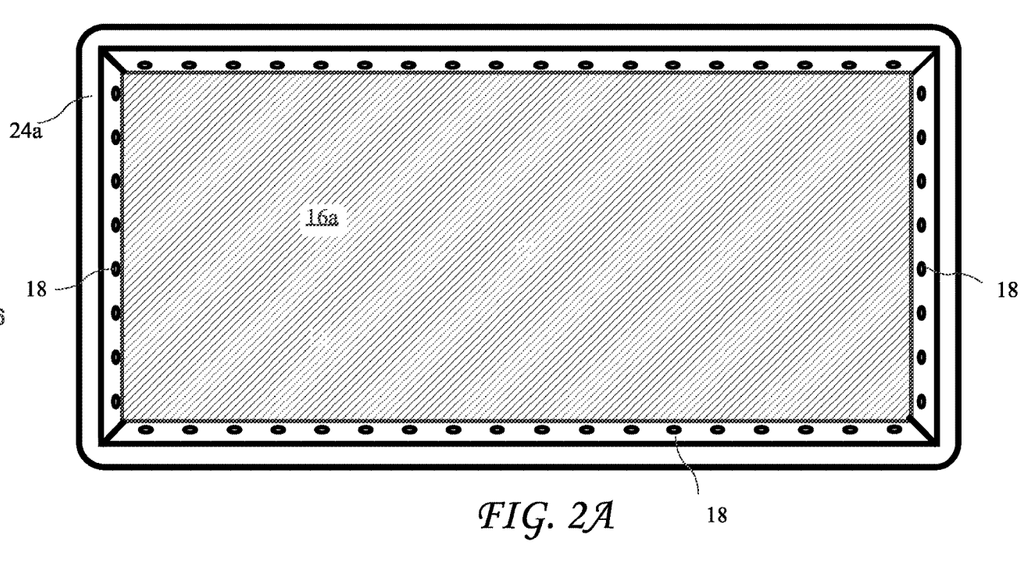
FIG. 2A is a top view of a base of the single row glue trap according to the present invention.
Figure 2B:
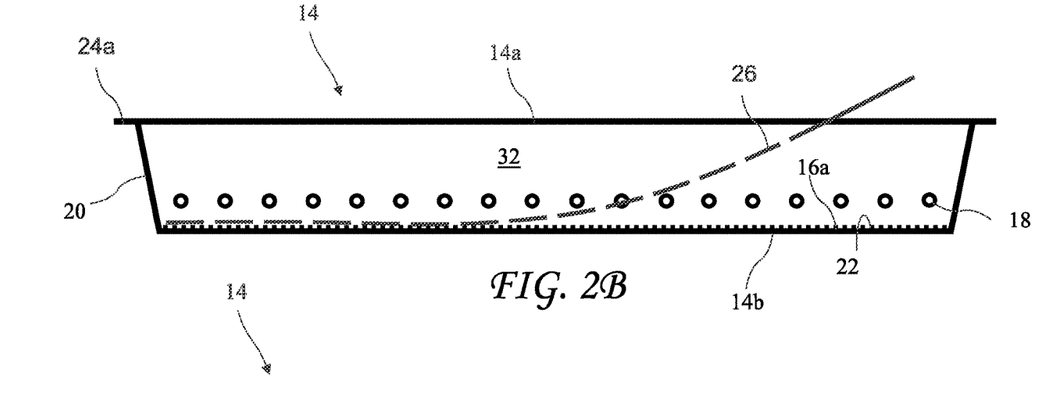
FIG. 2B is a side view of the base of the single row glue trap according to the present invention.
Figure 2C:
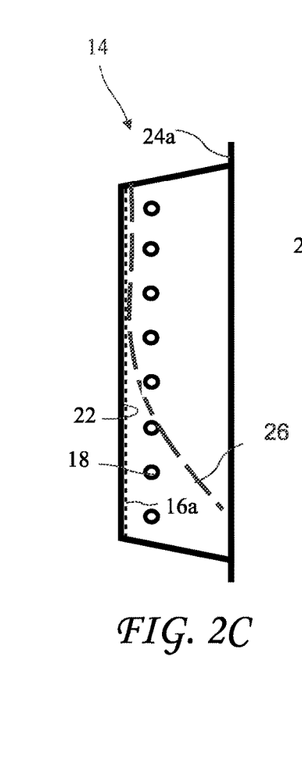
FIG. 2C is an end view of the base of the single row glue trap according to the present invention.

A top view of the base 14 of the glue trap 10 is shown in FIG. 2A, a side view of the base 14 is shown in FIG. 2B, and an end view of the base 14 is shown in FIG. 2C. The base 14 includes a base top 14a and a base bottom 14b opposite to the base top 14a. A glue layer 16a covers a floor 22 comprising a top surface of the base bottom 14b. Preferably, a removable cover sheet 26 resides over the glue layer 16a prior to use of the glue trap 10. The openings 18 are in side walls 20 of the base 14. An outward reaching top rim or flange 24a of the base 14 resides at the top of the side walls 20. The glue trap 10 is preferably made from plastic, and more preferably from black Low-Density Polyethylene (PDPE) plastic, and is preferably at least 0.25 mm thick, and more preferably between 0.25 mm and 3 mm thick and most preferably between 0.25 mm to 0.89 mm thick. The wall 20 thickness T is limited to prevent German cockroaches from lingering on deep openings or shelves having an opening depth OD created by the openings 18 allowing sensing the oleic acid from dead cockroaches in the glue trap 10 and escaping. The opening depth OD preferably equal to the thickness T.

Figures 3A, 3C:
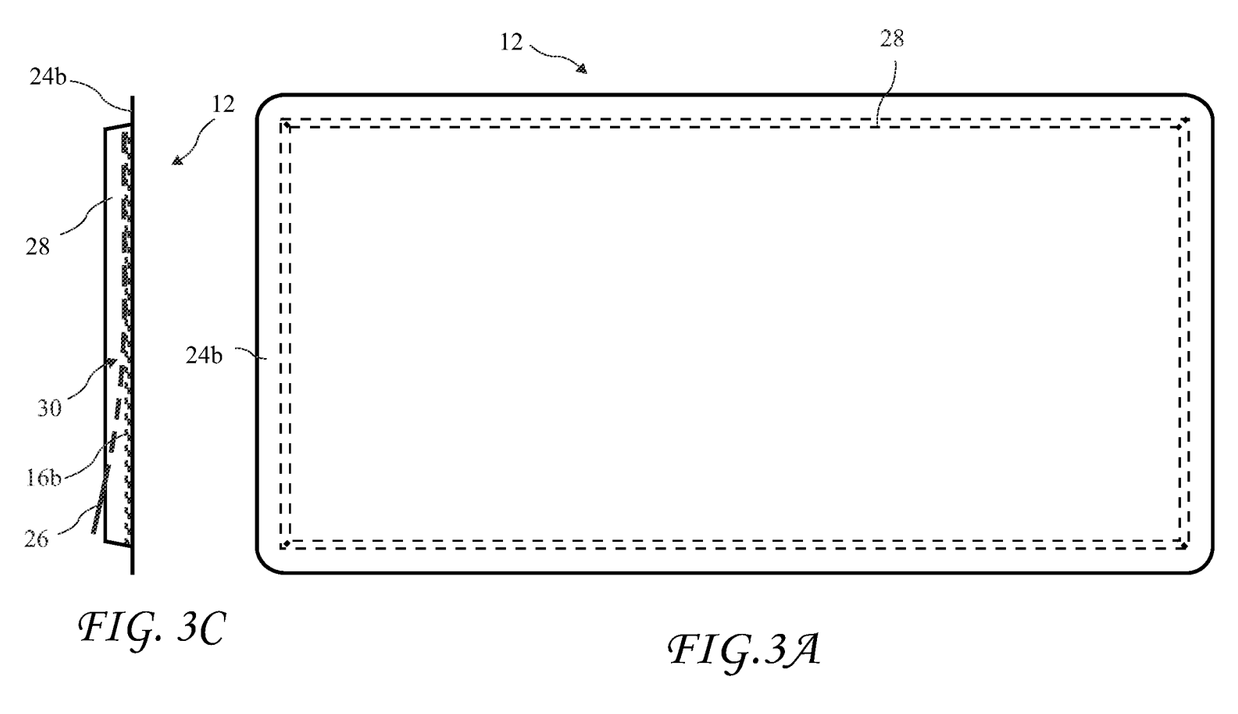
FIG. 3A is a top view of a lid of the single or multi row glue trap according to the present invention.
FIG. 3C is an end view of the lid of the single or multi row glue trap according to the present invention.
Figure 3B:
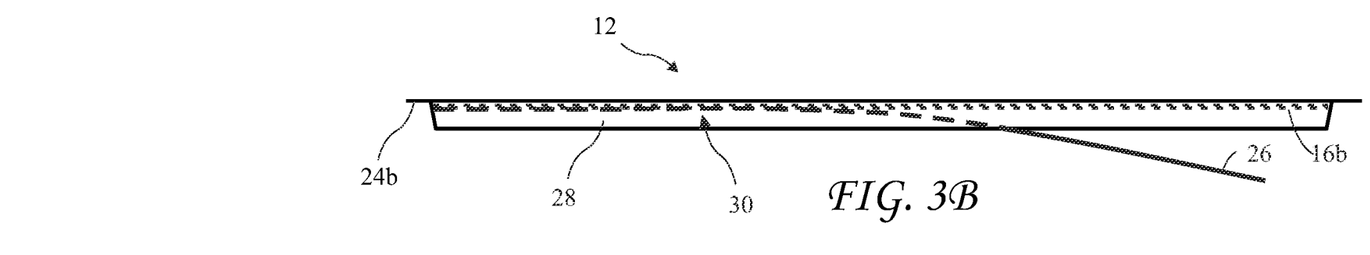
FIG. 3B is a side view of the lid of the single or multi row glue trap according to the present invention.

A top view of the lid 12 of the glue trap 10 is shown in FIG. 3A, a side view of the lid 12 is shown in FIG. 3B, and an end view of lid 12 is shown in FIG. 3C. The lid 12 includes a bottom surface (or ceiling) 30. The lid 12 also includes a lid rim 24b surrounding an insert 28 which engages the base 14, the insert 28 reaching down from the ceiling 30. A second glue layer 16b may reside on the ceiling 30 to capture German cockroaches which climb onto the ceiling 30. A removable cover sheet 26 may reside on the glue layer 16b.

Figure 4A:
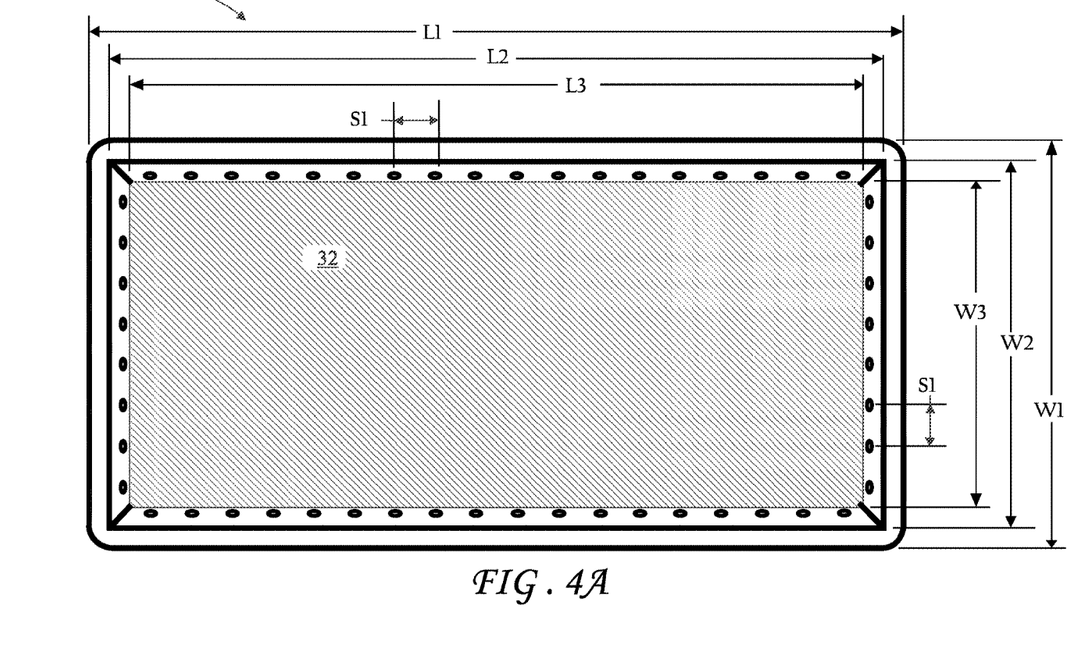
FIG. 4A is a dimensioned top view of the base of the single row glue trap according to the present invention.
Figure 4B:
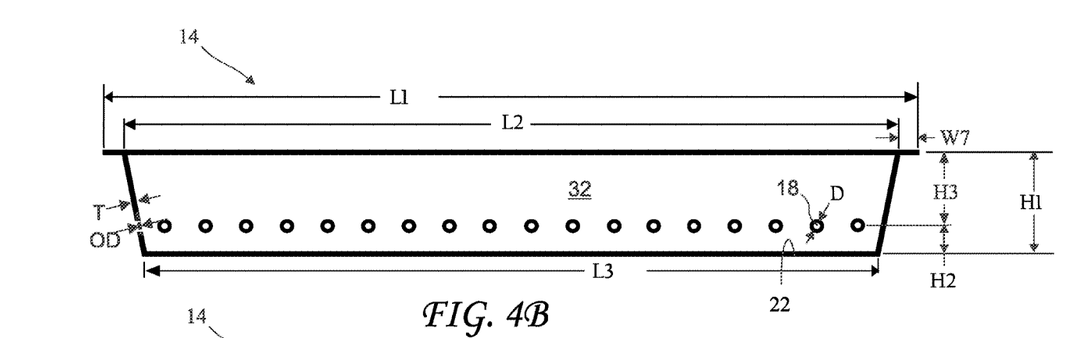
FIG. 4B is a dimensioned side view of the base of the single row glue trap according to the present invention.

A dimensioned top view of the base 14 is shown in FIG. 4A and dimensioned side view of the base 14 is shown in FIG. 4B. The base 14 including the flange 24a has an overall length L1, overall width W1 and an overall height H1. An interior 32 of the base 14 has a top length L2 and a top width W2, a bottom length L3, and a bottom width W3. The flange 24a reaches a width W7 out from the base 24.

The length L1 is preferably between 100 mm and 300 mm, and more preferably about 200 mm, and most preferably is 200 mm. The length L2 is preferably between 90 mm and 290 mm and more preferably about 190 mm, and most preferably is 190 mm. The length L3 is preferably between 80 mm and 280 mm, and more preferably is about 180 mm, and most preferably is 180 mm. The length L2 is preferably 10 mm less than the length L1, and the length L3 is preferably 10 mm less than the length L2.

The width W1 is preferably between 50 mm and 150 mm, and more preferably is about 100 mm, and most preferably is 100 mm. The width W2 is preferably between 40 mm and 140 mm, and more preferably is about 90 mm, and most preferably is 90 mm. The width W3 is preferably between 30 mm and 130 mm, and more preferably is about 80 mm, and most preferably is 80 mm.

The height H1 is preferably between 22 mm and 40 mm, and more preferably between 22 mm and 28 mm, and even more preferably is about 25 mm and most preferably is 25 mm. Further, the width W2 preferably is 10 mm less than the width W1, and the width W3 preferably is 10 mm less than the width W2. The width W7 is preferably between 3 mm and 7 mm, and more preferably about 5 mm, and most preferably is 5 mm.

The width of an adult German cockroach is about 4 mm, and the width of a nymph German cockroach is about 3.5 mm. It is important to have the smallest diameter D opening 18 for the German cockroaches to enter the glue trap 10 because the German cockroaches like small cracks and crevices which make German cockroaches feel safe for hiding and for breeding. German cockroaches are nocturnal insects that prefer dark environments making them more likely to enter the dark interior. A preferred diameter D of the openings 18 allows the German cockroaches to enter the glue trap 10 while providing a darker interior. Accordingly the openings 18 are preferably round and have a diameter D. The openings preferably are laterally spaced apart by a separation S1 and are preferably at the same height. The separation S1 is preferably between 5 mm and 20 mm, and more preferably is about 10 mm, and most preferably is 10 mm. The diameter D is preferably between 3.5 mm and 5 mm and more preferably about 4 mm and most preferably is 4 mm.

While round openings 18 may be easier to create and are preferred, oval, elliptical, nearly square (rounded corners), or square openings are acceptable. Such openings preferably have a width and a height between 3.5 mm and 5 mm, and more preferably about 4 mm, and most preferably is 4 mm. Such openings are intended to come within the scope of the present invention.

Centers of openings 18 have heights H2 above the floor 22. The height H2 is at least 6 mm above the floor 22, and is preferably between 6 mm and 10 mm above the floor 22, more preferably about 8 mm above the floor 22, and most preferably is 8 mm above the floor 22. The height H2 of the openings 18 is important because if the openings 18 are too low, the first German cockroaches to enter the glue trap 10 may immediately contact the glue 16a with front legs or antenna before completely entering the glue trap 10 and falling onto the glue 16a, and block the openings 18, preventing additional German cockroaches from entering the glue trap 10. Openings too low may also allow the German cockroach to reach into the glue trap 10, feel the glue 16a, and escape before becoming attached to the glue 16a. When the base 14 includes openings 18 at various heights, the lowest of the openings is preferably between 6 mm and 10 mm above the floor 22, more preferably is about 8 mm above the floor 22, and most preferably is 8 mm above the floor 22.

The ceiling 30 has a height H3 above the centers of the openings 18. The height H3 is preferably at least 14 mm, and more preferably between 14 mm and 20 mm, and even more preferably between 15 mm and 19 mm, and still even more preferably about 17 mm, and most preferably is 17 mm above the center of the openings. If the openings 18 are too close to the ceiling 30, some of the German cockroaches, after entering, may reach or crawl upwards towards the ceiling 30 and stay on the ceiling 30. It is important to catch the German cockroach as soon as possible because German cockroaches are drawn to the smell of German cockroach feces of trapped German cockroaches. When the base 14 includes openings 18 at various heights, the ceiling 30 is preferably at least 7 mm, and more preferably between 7 mm and 30 mm, and most preferably between 7 mm and 9 mm, above the center of the highest openings.

Figure 5A:
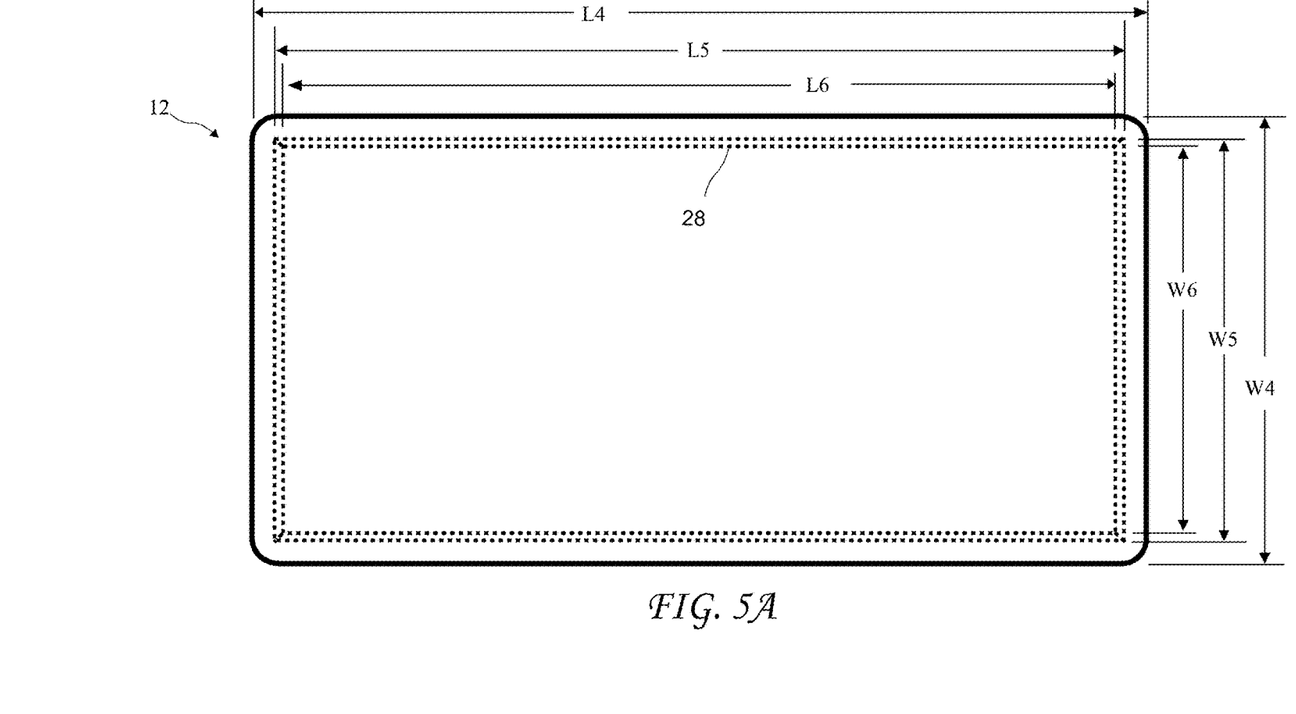
FIG. 5A is a dimensioned top view of the lid of the single or multi row glue trap according to the present invention.
Figure 5B:
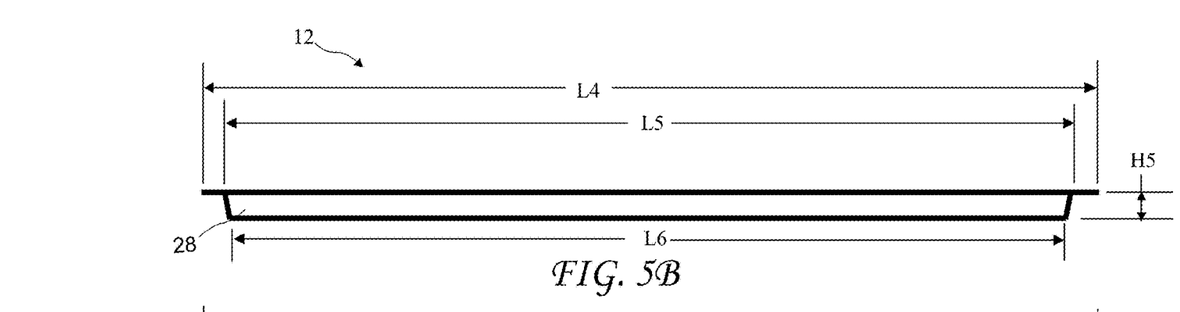
FIG. 5B is a dimensioned side view of the lid of the single or multi row glue trap according to the present invention.

A dimensioned top view of the lid 12 of the glue trap 10 is shown in FIG. 5A and a dimensioned side view of the lid 12 is shown in FIG. 5B. The lid 12 has an overall length L4 and overall width W4. The insert 28 has a top length L5, top width W5, a bottom length L6 and bottom width W6, and a height H5. The length L4 is preferably about 200 mm and more preferably is 200 mm. The width W4 is preferably about 100 mm and more preferably is 100 mm. The length L4 is preferably about 190 mm and more preferably is 190 mm. The width W4 is preferably about 100 mm and more preferably is 100 mm. The length L4 is preferably about 188 mm and more preferably is 188 mm. The width W4 is preferably about 88 mm and more preferably is 88 mm. The height H5 is preferably about 5 mm and more preferably is 5 mm.

The insert 28 is angled in relation to the side walls 20 preferably providing a tight seal between the lid 12 and the base 14. While the insert 28 is a preferred engagement structure between the lid and base, a glue trap with any engagement structure between the lid and base is intended to come within the scope of the present invention.

Figure 6A:
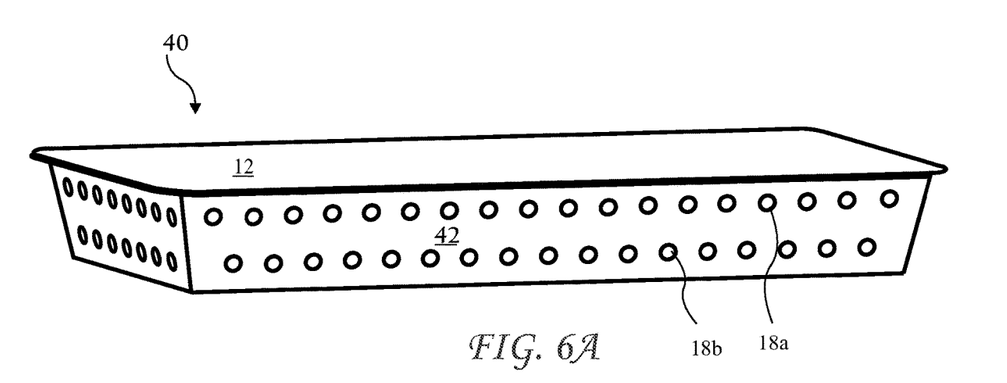
FIG. 6A is a perspective view of a multi row glue trap according to the present invention.
Figure 6B:
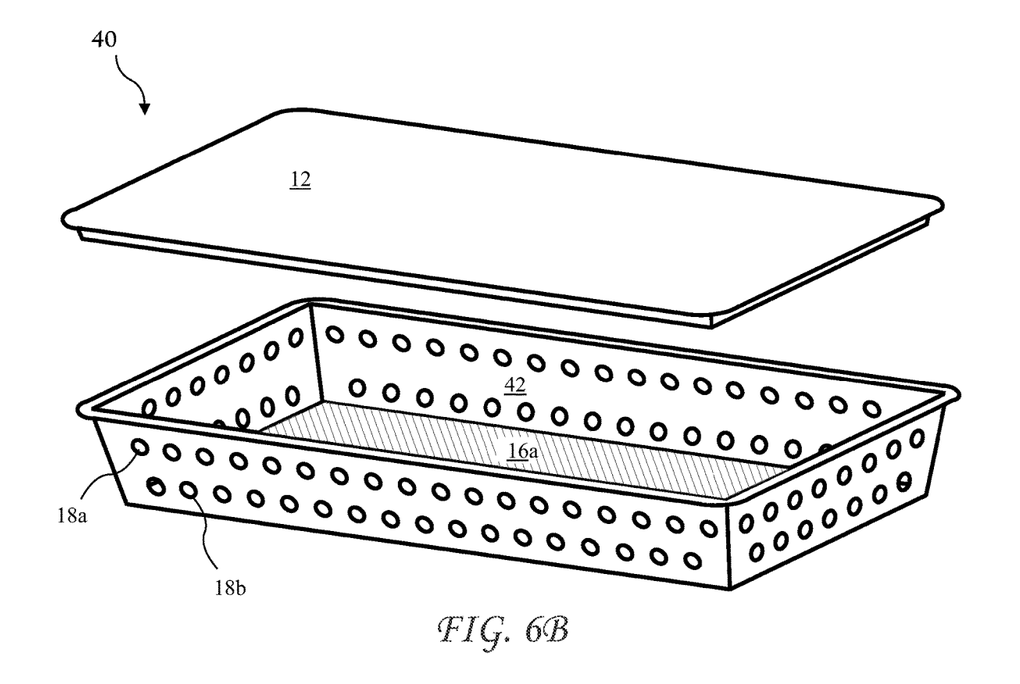
FIG. 6B is an exploded view of the multi row glue trap according to the present invention.

FIG. 6A is a perspective view of a multi row glue trap 40 and FIG. 6B is an exploded view of the multi row glue trap 40. The glue trap 40 includes the lid 12 and a multi row base 42. The base 42 includes two rows of openings 18a and 18b in side walls 20 at different heights, but may include three or more rows of openings, or openings are at various heights. The glue trap 40 is similar to the glue trap 10, but includes openings at different heights, and the overall height may be greater to accommodate the additional openings.

Figure 7A:
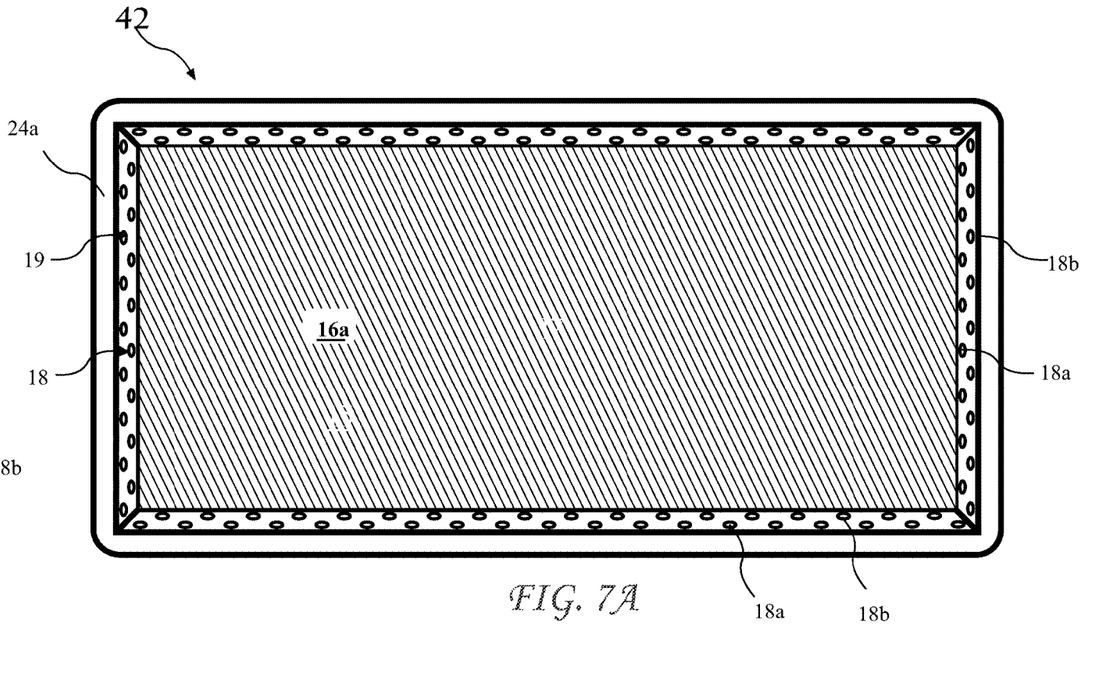
FIG. 7A is a top view of a base of the multi row glue trap according to the present invention.
Figure 7B:
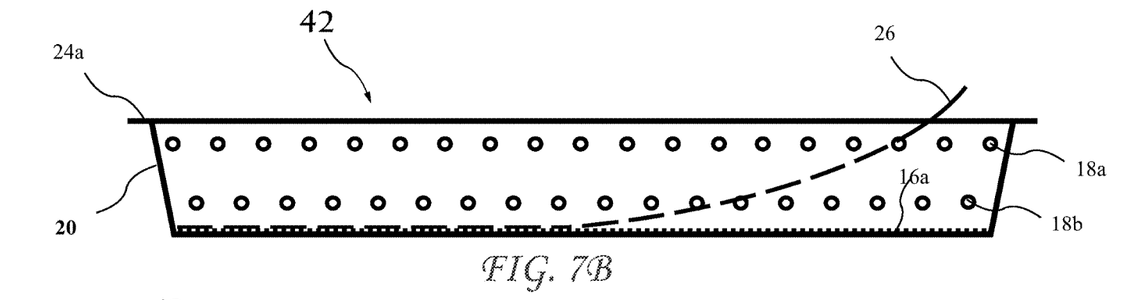
FIG. 7B is a side view of the base of the multi row glue trap according to the present invention.
Figure 7C:
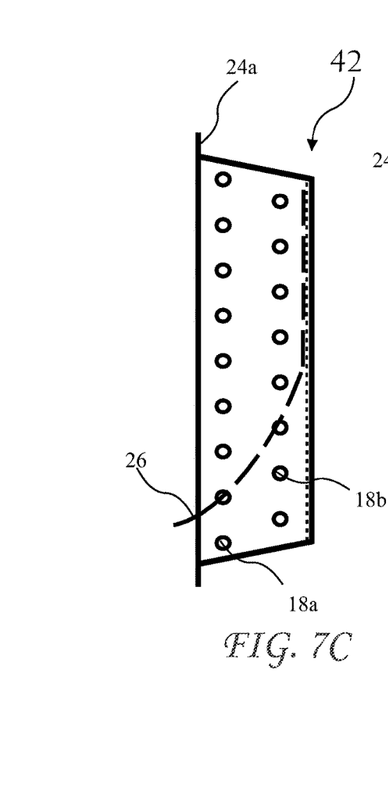
FIG. 7C is an end view of the base of the multi row glue trap according to the present invention.

FIG. 7A is a top view of a base 14a of the multi row glue trap 40, FIG. 7B is a side view of the base 14a of the multi row glue trap 40, and FIG. 7C is an end view of the base 14a of the multi row glue trap 40.

Figure 8A:
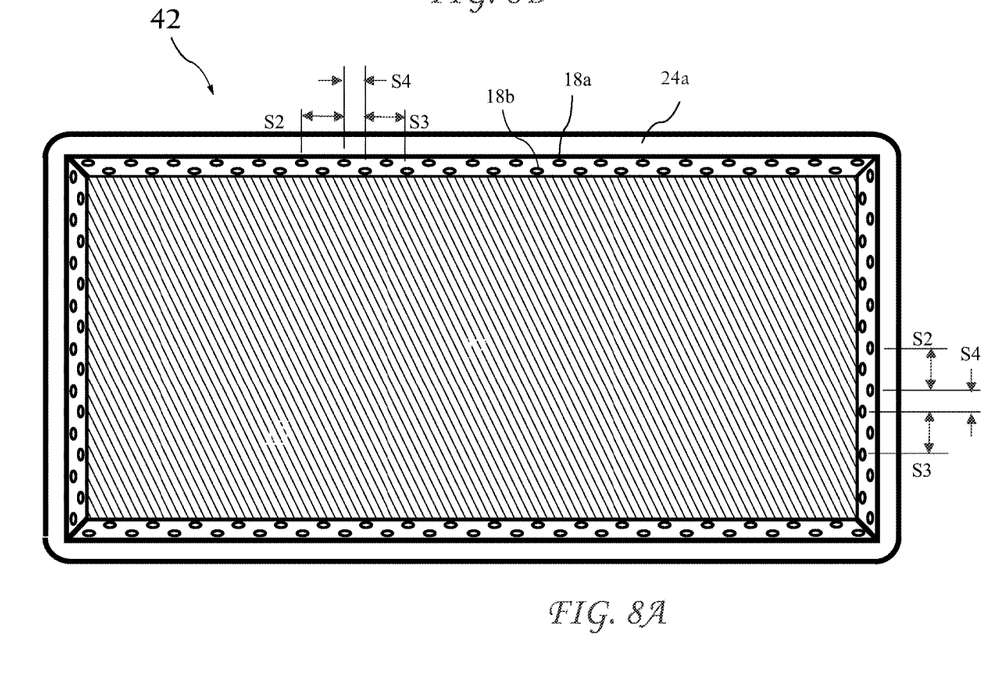
FIG. 8A is a dimensioned top view of the base of the multi row glue trap according to the present invention.
Figure 8B:
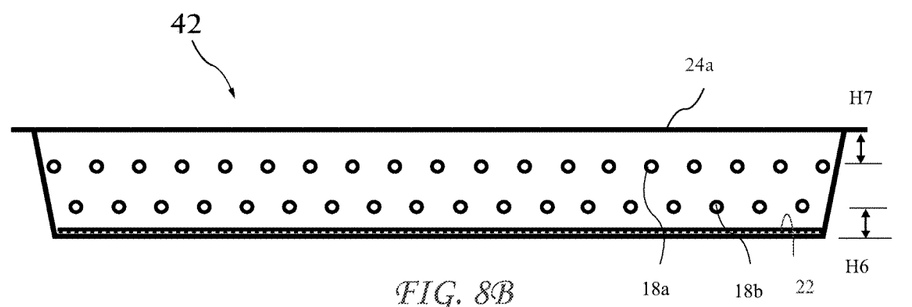
FIG. 8B is a dimensioned side view of the base of the glue trap according to the present invention.

FIG. 8A is a dimensioned top view of the base 42 of the multi row glue trap 40, and FIG. 8B is a dimensioned side view of the base 42 of the glue trap 40. The base 42 includes lowest openings 18b a height H6 above the floor 22 and highest openings 18a a height H7 below the flange 24a, or below the ceiling 30. The heights H6 of the lowest openings 18b are at least 6 mm above the floor 22, and preferably between 6 mm and 10 mm above the floor 22, more preferably about 8 mm above the floor 22, and most preferably is 8 mm above the floor 22. The heights H7 of the ceiling 30 above the center of the highest openings 18a are at least 7 mm, and preferably between 7 mm and 30 mm, and more preferably between 8 mm and 12 mm, and even more preferably about 10 mm, and most preferably is 10 mm above the centers of the highest openings.

The openings 18a and 18b are preferably spaced apart a separation S2 of preferably about 10 mm. The openings 18a and 18b are preferably staggered by a spacing S4 of preferably 5 mm.

Figures 9A, 9B, 10:
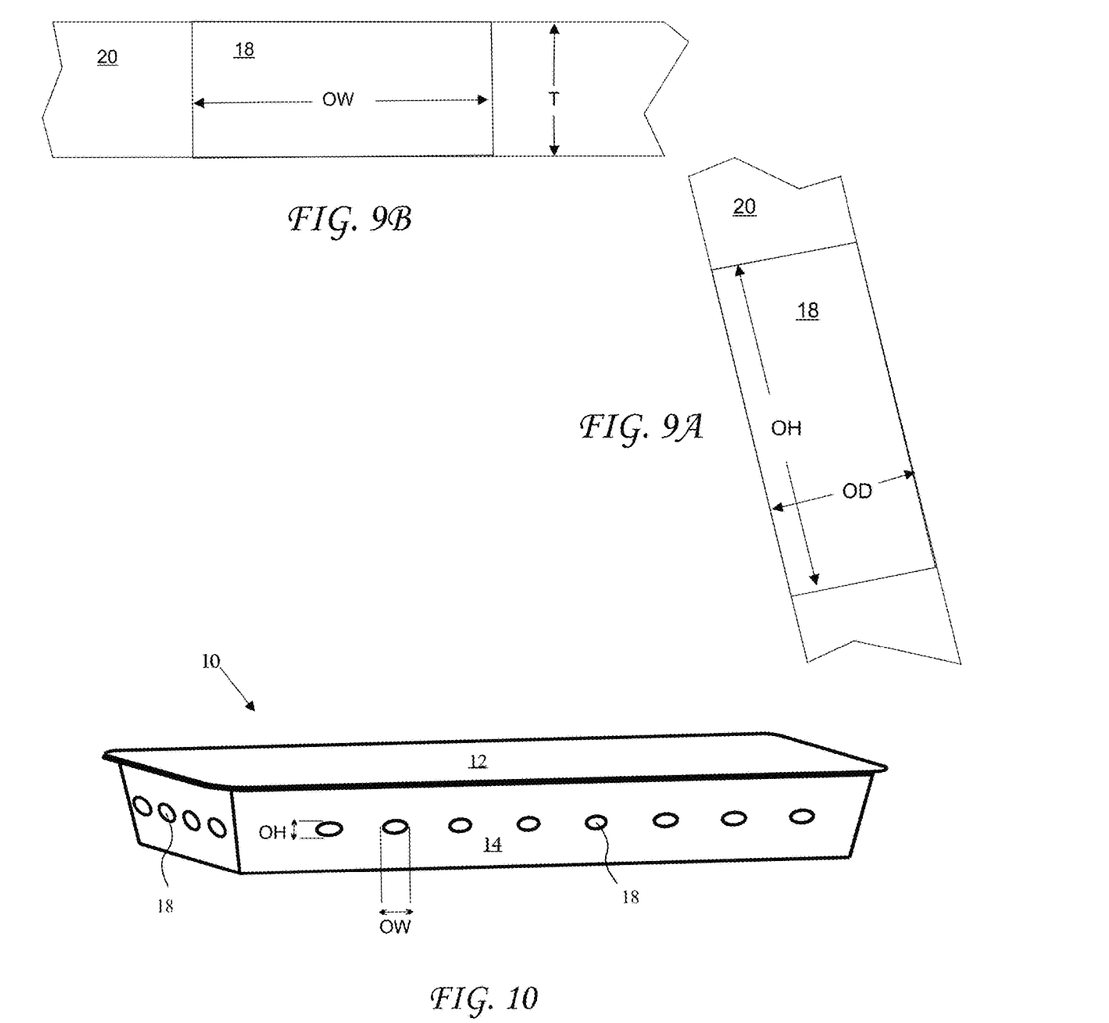
FIG. 9A is a side view of an opening into the glue trap according to the present invention.
FIG. 9B is a top view of an opening into the glue trap according to the present invention.
FIG. 10 is a perspective view of the glue trap having oval openings according to the present invention.

A side view of the openings 18, 18a, or 18b into the glue trap 10 or 40 is shown in FIG. 9A and a top view of the openings 18, 18a, or 18b into the glue trap 10 is shown in FIG. 9B. The openings have an opening width OW between 3.5 mm and 4.5 mm, an opening height OH between 3.5 mm and 4.5 mm. The openings have an opening depth OD of preferably at least 0.25 mm, and more preferably between 0.25 mm and 3 mm and most preferably between 0.25 mm to 0.89 mm, and is preferably the thickness T of the walls 20.

The glue trap 10 or 40 is preferably made of plastic, and more preferably Low-Density Polyethylene (PDPE) plastic and is preferably black, brown, blue, or a dark color, and is more preferably black, because nocturnal insects like the German cockroach prefer dark and small cracks and crevices for harborage. The plastic is preferably between 0.25 mm and 0.89 mm thick.

FIG. 10 is a perspective view of the glue trap 10 with the lid 12 on the base 14. In an alternative embodiment, the base 14 having a plurality of oval shaped openings 18 along the side walls 20 of the base 14. The openings having an opening height OH and an opening width of OW. The opening height OH preferably have a height between 3.5 mm and 5 mm, and more preferably about 4 mm, and most preferably 4 mm. The opening width OW preferably have a width between 3.5 mm and 5 mm, and more preferably about 4 mm, and most preferably 4 mm.

While the invention herein disclosed has been described by means of specific embodiments and applications thereof, numerous modifications and variations could be made thereto by those skilled in the art without departing from the scope of the invention set forth in the claims.

I claim:

1. A German cockroach glue trap, comprising:
a base;
a base floor of the base;
side walls of the base;
a base top opposite to the base floor;
a base interior between the side walls, the base floor and the base top;
a glue layer on the base floor;
a lid configured to attach to the base top of the base, the lid providing a ceiling of the base interior;
a plurality of openings in the side walls, all of the openings have an opening width OW between 3.5 mm and 4.5 mm, an opening height OH between 3.5 mm and 12 4.5 mm, and an opening depth OD between 0.25 mm and 3 mm;
a lowest center height of a lowest of the openings is between 6 mm and 10 mm above the base floor;
the ceiling is between 7 mm and 30 mm above a center height of a highest of the openings; and
a base top rim surrounding the base top, the base top rim is about 5 mm out from the base interior.

2. The glue trap of claim 1, further including a second glue layer on the ceiling.

3. The glue trap of claim 1, wherein the trap is made of a dark plastic between 0.25 mm and 0.89 mm thick and the opening depths are between 0.25 mm and 0.89 mm.

4. A German cockroach glue trap, comprising:
a base;
a base floor of the base;
side walls of the base;
a base top opposite to the base floor;
a base interior between the base floor and the base top;
a base thickness between 0.25 mm and 3 mm;
a glue layer on the base floor;
a lid configured to attach to the base top of the base, the lid providing a ceiling of the base interior;
a plurality of openings in the side walls, all of the openings have an opening width OW of about 4 mm, an opening height OH of about 4 mm and an opening depth 12 OD equal to the base thickness;
a lowest center height of a lowest of the openings about 8 mm above the base floor;
a highest center height of a highest of the openings about 10 mm below the ceiling;
a second glue layer on the ceiling;
a base top rim surrounding the base top, the base top rim is between 3 mm and 7 mm out from the base interior.

* * * * *